United States Patent [19]

Manning

[11] Patent Number: 4,718,744

[45] Date of Patent: Jan. 12, 1988

[54] COLLIMATING LENS AND HOLDER FOR AN OPTICAL FIBER

[75] Inventor: Randy M. Manning, New Cumberland, Pa.

[73] Assignee: AMP Incorporated, Harrisburg, Pa.

[21] Appl. No.: 766,857

[22] Filed: Aug. 16, 1985

[51] Int. Cl.⁴ .................................................. G02B 6/32
[52] U.S. Cl. .................................... 350/96.20; 350/96.18
[58] Field of Search ............... 350/96.18, 96.20, 96.21, 350/96.22

[56] References Cited

U.S. PATENT DOCUMENTS

| | | | |
|---|---|---|---|
| 4,420,219 | 12/1983 | Muchel | 350/96.18 |
| 4,421,383 | 12/1983 | Carlsen | 350/96.2 X |
| 4,534,616 | 8/1985 | Bowen et al. | 350/96.2 |
| 4,539,476 | 9/1985 | Donuma et al. | 350/96.18 X |

OTHER PUBLICATIONS

*Optical Spectra*, W. John Carlsen & Paul Melman, 10/80, pp. 41 & 42, "Connectors That Stretch".

Primary Examiner—John Lee
Attorney, Agent, or Firm—Gerald K. Kita

[57] ABSTRACT

A connector 1 for an optical fiber 2 comprises a light transmissive body 5 having a light transmissive end 6 and a cavity 8 having an entrance 9 for receiving the optical fiber 2, the interior surface 12 of the cavity 8 forms a holder 13 for the optical fiber 2, and the interior surface 12 of the cavity 8 forms an collimating lens 10 axially aligned with the holder 13 and positioned between the holder 13 and the light transmissive end 6.

14 Claims, 6 Drawing Figures

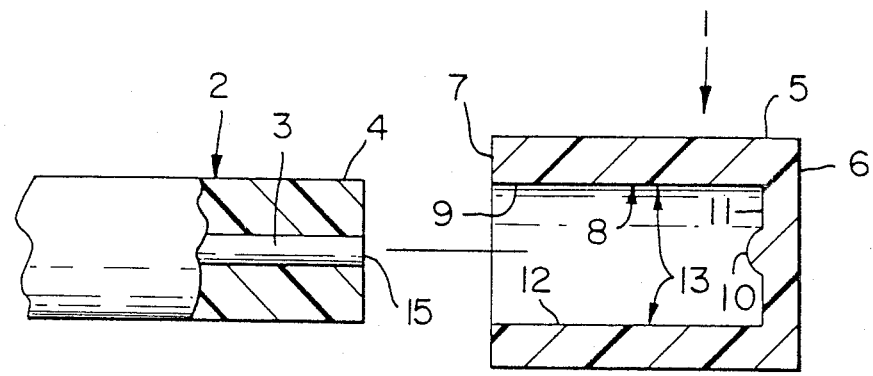
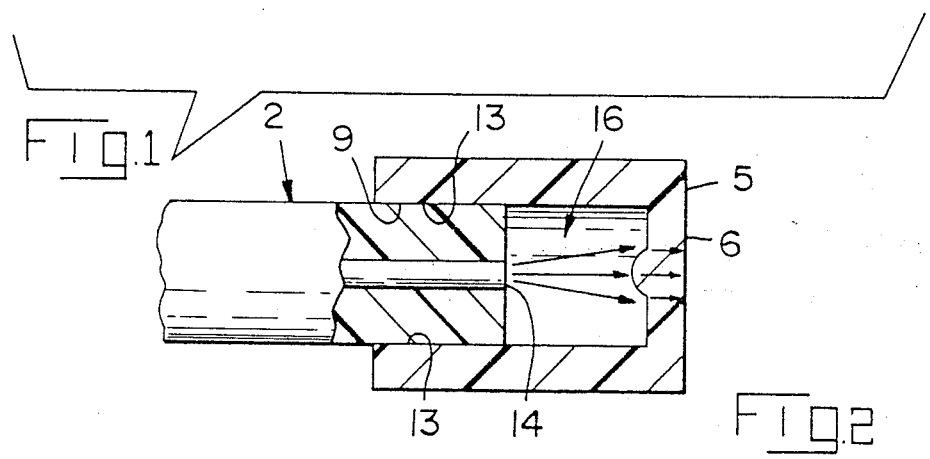
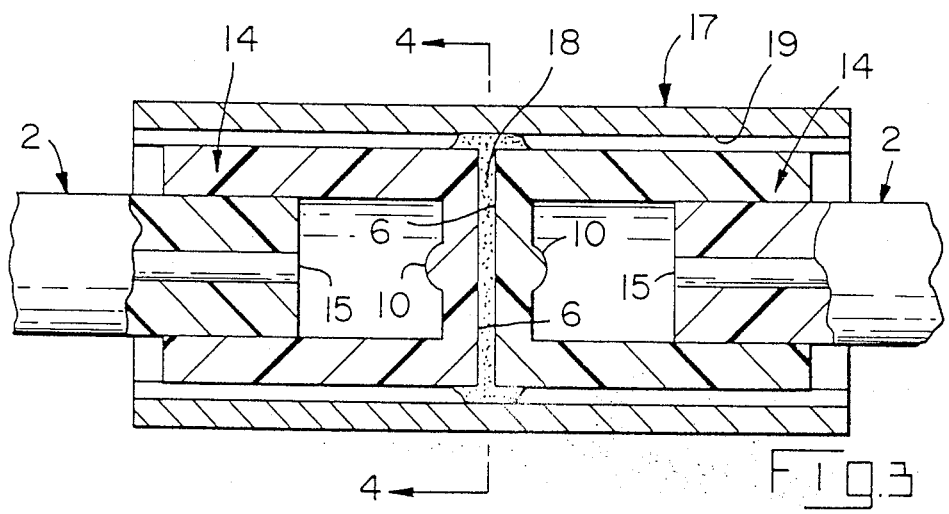

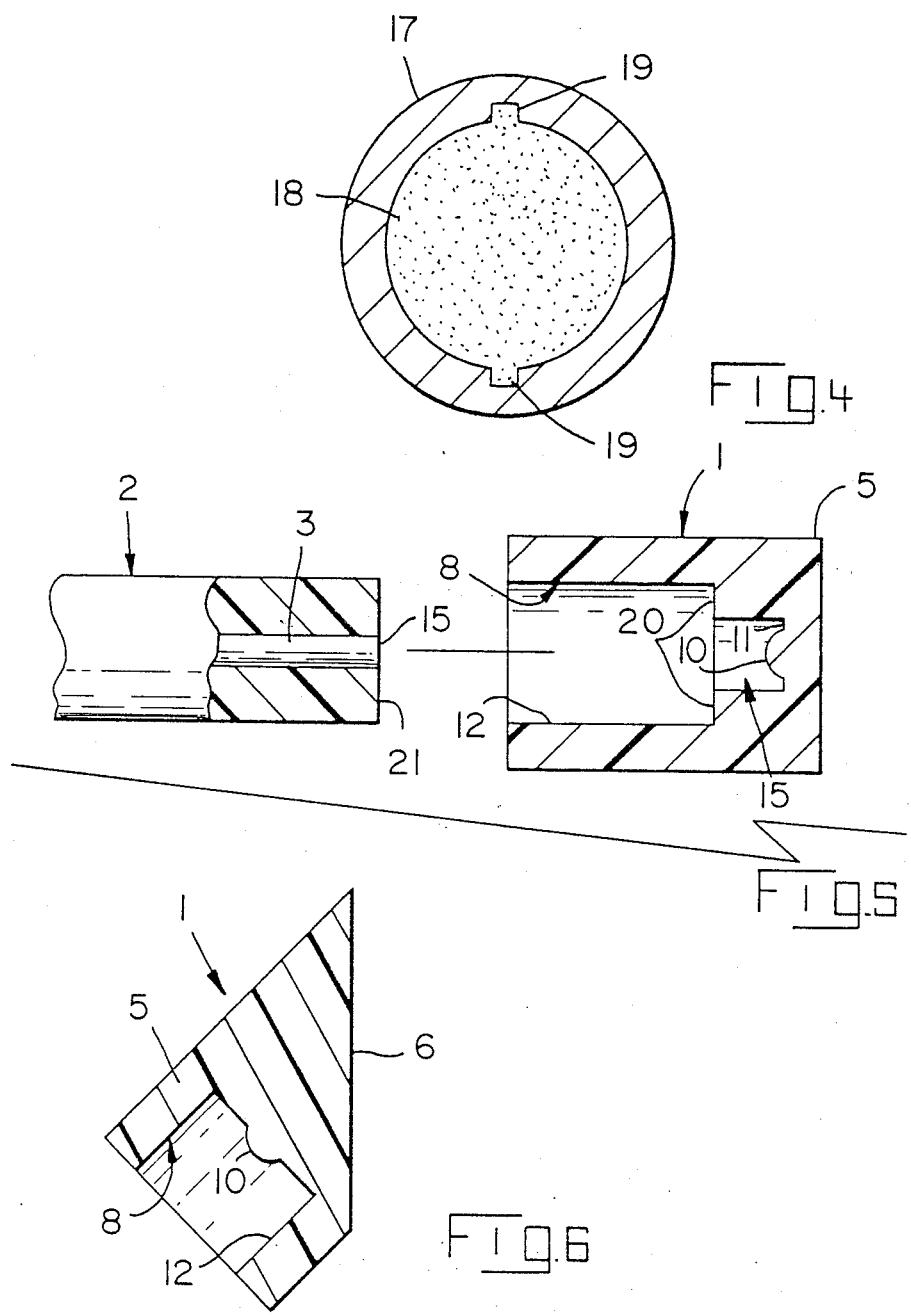

COLLIMATING LENS AND HOLDER FOR AN OPTICAL FIBER

FIELD OF THE INVENTION

The invention relates to a connector for an optical fiber, and more particularly to a connector having a cavity that forms a collimating lens and a holder for the fiber.

BACKGROUND OF THE PRIOR ART

A known connector for optical fiber is a one piece body of molded plastics material. A front end of the known connector has an aspheric lens the surface of which has an anti-reflective coating. The known connector has a holder in a cavity for aligning an end of the optical fiber axially with the lens surface. The end of the fiber is joined to the body by an adhesive. The adhesive and the body comprise optically transmissive materials having an index of refraction matching that of the fiber. Thereby, an optical signal emerging from the end of the optical fiber is transmitted successively through the adhesive and the body. The optical signal diverges until collimation by the lens surface and coating.

A requirement of the known connector is that the cavity, the holder and the lens must be in accurate axial alignment. The known connector is formed by moulding fluent plastics material internally of a set of dies of a moulding apparatus. One of the dies forms the aspheric lens of the known connector. A core pin of the apparatus is machined with a shape to form the cavity and holder. The core pin must be retained in desired axial alignment with the die that forms the lens, during the time that the fluent plastics material is introduced and solidified in the moulding apparatus. The core pin and the die are separate parts. When the dies open and move away from one another to allow removal of the moulded connector, the core pin is withdrawn relative to the die that forms the lens of the moulded connector. As a consequence, the axial alignment of the core pin and the die will vary each time fluent material is introduced and molded in the moulding apparatus.

SUMMARY OF THE INVENTION

The invention resides in a connector for an optical fiber having an optically transmissive body. A spherical collimating lens and a holder for the fiber are on the interior surface of a cavity of the body. The cavity is suitable for formation by a single core pin. The surface of the core pin may be machined accurately to form both the lens and the holder, during fabrication of the body by moulding fluent plastics material in a moulding apparatus. In the moulding apparatus, the core pin forms the lens and the holder on a continuous surface of the cavity in the body. The axial alignment of the lens and the holder will not vary during repeated use of the core pin in the molding apparatus.

A connector according to the invention comprises a light transmissive body, a cavity in the body and having an entrance for receiving an end of an optical fiber, an aspheric collimating lens, and a holder in the cavity for axially aligning the fiber with the lens, characterized in that, the lens is in the cavity, and the lens is between the holder and a light transmissive end of the body.

An object of the invention is to provide a connector for an optical fiber, which has an optically transmissive body and a cavity in the body, a collimating lens in the cavity, and a holder in the cavity for aligning an optical fiber with the lens.

Another object is to provide a connector for an optical fiber having a collimating lens and a holder for aligning an optical fiber in alignment with the lens formed on a continuous internal surface of the body.

Another object is to provide a connector for an optical fiber having a collimating lens formed on an end wall of a cavity and between a holder for aligning an optical fiber and a light transmissive end of the body.

Other objects and advantages of the invention will be apparent from the following description of the invention taken in conjunction with the accompanying drawings.

DESCRIPTION OF THE DRAWINGS

FIG. 1 is a fragmentary, enlarged elevation view in section illustrating an optical fiber and a connector according to the invention, with the optical fiber shown exploded from the connector.

FIG. 2 is a fragmentary, enlarged elevation view in section illustrating an assembly of the fiber and connector shown in FIG. 1.

FIG. 3 is a fragmentary, enlarged elevation view in section illustrating a splice assembly of two of the assemblies shown in FIG. 2 constructed for transmission of an optical signal from one to the other.

FIG. 4 is an enlarged section view taken along the line 4—4 of FIG. 3.

FIG. 5 is a fragmentary, enlarged elevation view in section illustrating an optical fiber and another form of a connector according to the invention, with the fiber shown exploded from the connector.

FIG. 6 is a fragmentary, enlarged elevation view in section illustrating another form of the splice assembly shown in FIG. 3.

DESCRIPTION OF THE INVENTION

FIGS. 1 and 2 illustrate one form of a connector 1 for an optical fiber 2 having a light transmissive fiber portion 3 surrounded by a layer 4 of insulative material that covers and protects the fiber portion 3. The layer 4 and the fiber portion 3 together comprise the optical fiber 2. The layer 4 also may be a metal sleeve for protecting the fiber portion 3 attached to the fiber portion 3 by an adhesive material. The cross section of the optical fiber 2 is cylindrical, although the cross section may have an alternative shape depending upon the shape of the layer 4. The connector 1 comprises a single piece body 5 moulded from a light transmissive plastics material. As shown in FIG. 4, the body 5 is cylindrical. The body 5 has a light transmissive front end 6, and an opposite, rear end 7. A cavity 8 has an entrance 9 communicating with the rear end 7 for receiving the optical fiber 2. The cavity 8 extends toward the front end 6. A spherical collimating lens 10 faces the interior of the cavity 8 and is formed on an end wall 11 of the cavity 8 opposite the entrance 9. The lens shape is spherical, meaning a true spherical shape or any aberrant spherical shape. The interior surface 12 of the cavity 8 forms a holder 13 for frictionally gripping the optical fiber 2. For example, the cross section of the cavity 8 matches that of the optical fiber 2 to form a holder 13 that surrounds and frictionally grips the optical fiber 2. The gripping force originates from resilient, elastic properties of the plastics material.

FIG. 2 shows a connector assembly 14 wherein the optical fiber 2 is received through the entrance 9 and is retained by the holder 13 in the cavity 8 opposite the lens 10. An optical signal, illustrated schematically by the arrows, emerges from an end 15 of the fiber 3 and diverges while being transmitted through an air gap 16 separating the end 14 of the optical fiber 2 and the lens 10. The lens 10 is aspheric and collimates the optical signal. The collimated optical signal is transmitted through the body 5 and through the end 6 of the body 5.

Should some of the optical signal miss the lens 10, the connector 1 will incur undesired loss of the optical signal. To avoid such loss, the lens 10 must be positioned in accurate axial alignment with the end 15 of the optical fiber 2 in the holder 13 to receive all of the diverging optical signal. The holder 13 must hold the optical fiber 2 in accurate axial alignment with the lens 10. Accordingly, the lens 10 and the holder 13 must be in accurate axial alignment with one another.

The connector 1 is suitable for fabrication by moulding fluent plastics material in a moulding apparatus, not shown. The cavity 8 is suitable for formation by a single core pin, not shown. The surface of the core pin may be machined accurately to form both the lens 10 and the holder 13, during fabrication of the body 5 by moulding fluent plastics material in a moulding apparatus. In the moulding apparatus, the core pin forms the lens 10 and the holder 13 on the continuous interior surface 12 of the cavity 8. The axial alignment of the lens 10 and the holder 13 will not vary during repeated use of the core pin in the molding apparatus.

FIG. 3 shows the connector assembly 14 opposite another like connector assembly 14 inserted into opposite ends of a coupling sleeve 17. A quantity of light transmissive fluid 18 contacts the corresponding light transmissive end 6 of each connector 1, to prevent optical reflection and assure transfer of an optical signal from one connector 1 to the other. The sleeve 17 has an axial passageway 19 for venting air displaced by the connectors 1, 1.

FIG. 5 illustrates an embodiment of the connector 1, wherein the cavity 8 further includes a shoulder 20 projecting into the cavity 8 and on the continuous interior surface 12 of the cavity 8. The continuous surface 12 is suitable for accurate formation by a single core pin, not shown. The end 21 of the optical fiber 2 will engage the shoulder 20 for accurately spacing the light transmissive end 15 of the optical fiber 2 from the lens 10, and for controlling the width of the air gap 15 between the shoulder 20 and the lens 10.

FIG. 6 shows an embodiment of the connector 1 wherein the end 6 has a surface angled forty-five degrees from the longitudinal axis of the cavity 8.

Although preferred embodiments of the connector 1 are shown and described, other embodiments and modifications are intended to be covered by the appended claims, for example, an embodiment having any desired angular orientation of the light transmissive end 6, or a modification wherein a means other than the shoulder 20 is provided on the surface 12 of the cavity 8 to engage the end 21 of the optical fiber 2.

I claim:

1. A connector for an optical fiber comprising a light transmissive body, a cavity in the body having an entrance for receiving an end of an optical fiber, an aspheric lens, and a holder in the cavity for axially aligning the fiber with the lens, characterized in that, the body is of one piece construction, the cavity and the holder and the lens are formed on an internal surface of the body with the lens being axially aligned with the holder and positioned between the holder and a light transmissive end of the body, and the holder and the lens are formed as one piece with the body.

2. A connector for an optical fiber as recited in claim 1, wherein the lens is on an end wall of the cavity opposite the entrance of the cavity.

3. A connector for an optical fiber as recited in claim 1, wherein the holder includes an optical fiber engaging shoulder spaced from the lens.

4. A connector for an optical fiber as recited in claim 3, wherein the shoulder projects into the cavity and is spaced from the entrance of the cavity.

5. A connector for an optical fiber as recited in claim 1, wherein the holder and the lens are on a continuous interior surface of the cavity.

6. A connector for an optical fiber as recited in claim 5, wherein the entrance of the cavity is on the continuous interior surface of the cavity.

7. A connector for an optical fiber as recited in claim 5, wherein the holder includes a shoulder on the continuous interior surface of the cavity.

8. A connector for an optical fiber comprising, a light transmissive body of one piece construction and having a light transmissive end and a cavity having an entrance for receiving the end of an optical fiber, an interior of the one piece body forms a holder for the optical fiber, the interior of the one piece body is curved to form a collimating lens axially aligned with the holder and positioned between the holder and the light transmissive end, and the holder and the lens are formed as one piece with the body.

9. A connector for an optical fiber as recited in claim 8, wherein the lens is on an end wall of the cavity opposite the entrance of the cavity.

10. A connector for an optical fiber as recited in claim 8, wherein the holder includes a shoulder spaced from the lens.

11. A connector for an optical fiber as recited in claim 10, wherein the shoulder projects into the cavity and is spaced from the entrance of the cavity.

12. A connector for an optical fiber as recited in claim 8, wherein the holder and the lens are on a continuous interior surface of the cavity.

13. A connector for an optical fiber as recited in claim 12, wherein the entrance of the cavity is on the continuous interior surface of the cavity.

14. A connector for an optical fiber as recited in claim 12, wherein the holder includes a shoulder on the continuous interior surface of the cavity.

* * * * *